United States Patent Office 2,709,138
Patented May 24, 1955

2,709,138

METHOD FOR PREVENTING THE ADHERING OF SAUSAGE CASINGS TO THE SAUSAGE MASS

Richard Weingand, Walsrode, and Ulrich Ostwald, Ledigenheim, Bomlitz, near Walsrode, Germany No Drawing. Application September 25, 1951, Serial No. 248,266

4 Claims. (Cl. 99—176)

This invention relates to improved sausage casings which do not adhere to the sausage mass and to a process for preparing same.

As is well-known in the art, both natural and artificial sausage casings tend to adhere firmly to the sausage mass so that the casing cannot be withdrawn from the mass easily and smoothly, but rather the casing tears down and takes with it a relatively thick layer of sausage mass which for the most part is lost. This is particularly true with sausages containing much albumin, such as blood, and but little fat. With artificial casings which are inedible this loss of sausage mass with the casing is particularly wasteful since the casing is thrown away and the sausage mass adhering thereto is lost.

This adhesion between the sausage mass and the casing is due to the high affinity of the albumin for the casing. Consequently, the boiling and subsequent drying of the sausages in the course of manufacture produces a strong bond between the mass and its casing. As noted, this is particularly evidenced in sausages containing a high albumin content, such as blood-pudding. As a result, inedible artificial casings made from cellulose or similar substances are not employed with these high-albumin sausages, because of the difficulty of withdrawing the casing and because of the waste attending removal of the inedible casing.

It has now been found that cellulosic sausage casings can be modified so that the interior wall thereof loses its affinity for the sausage mass so that the casing can be withdrawn from the sausage without difficulty. At the same time, the other properties required of a satisfactory sausage casing are maintained so that the casing is unaffected with regard to both taste and hygienic properties, i. e., the strength, extension, water vapor permeability, and the like, are unaffected.

This problem is solved according to the present invention by treating the interior wall of the sausage casing with substances which combine chemically or absorptively therewith. Substances particularly useful for this purpose are those which render the interior wall of the casing hydrophobic up to a certain extent, probably involving an electrical change. Especially advantageous results have been obtained by employing an isocyanate (—N=C=O) or an ethylenimine

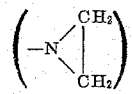

containing a hydrophobic radical such as a fatty acid residue. In cellulosic sausage casings the isocyanate or ethylenimine radical becomes affixed to the hydroxyl groups while the fatty acid radical prevents the interior wall of the casing from adhering to the albumin of the sausage mass.

Extremely small quantities of the treating agents have proven sufficient for producing the desired effect in the practice of the invention. For example, a one per cent solution of a fatty acid isocyanate is adequate to prevent adhesion between a cellulosic casing and a sausage mass such as black-pudding.

The treatment of the sausage casing may be effected by dissolving or suspending the agent in the plasticizer bath used for the production of the artificial casing, the casing being treated both internally and externally with the treating medium. It is advantageous to treat only the interior of the casing with the solution or suspension of the agent initially and, therefore, to pass the casing through the plasticizer bath in conventional manner so that the plasticizer can act upon and enter the casing only at the exterior wall. This operational procedure assures that the treating agent will not be rinsed out in the plasticizer bath.

The following non-limitative example is given by way of illustrating the practice of the invention:

*Example*

The interior wall of a sausage casing of cellulose hydrate made from viscose or collodion is rinsed out with a one per cent emulsion of stearyl isocyanate

After squeezing the casing to remove excess treating agent, it is conducted through a plasticizer bath consisting of a five per cent glycerine solution and thereafter dried.

Alternatively, the stearyl isocyanate may be added directly to the plasticizer bath, whereupon the casing is dried after passage through this single combined bath.

Various changes and modifications may be made without departing from the spirit and scope of the present invention and it is intended that the annexed claims embrace such obvious changes and modifications.

Having thus fully described our invention, we claim:

1. A sausage casing comprising cellulosic material, the inner wall of said casing being chemically combined with a member selected from the group consisting of stearyl isocyanate and N-stearyl-ethylenimine.

2. A method for preventing the adhesion of cellulosic sausage casing to the sausage mass, which comprises treating the inner wall of said casing with a member selected from the group consisting of stearyl isocyanate and N-stearyl-ethylenimine, whereby a chemical reaction with said inner wall is effected.

3. A method for preventing the adhesion of cellulosic sausage casing to the sausage mass, which comprises treating the inner wall of said casing with stearyl isocyanate and N-stearyl-ethylenimine, whereby a chemical reaction with said inner wall is effected.

4. A method for preventing the adhesion of cellulosic sausage casing to the sausage mass, which comprises treating the inner wall of said casing with N-stearyl-ethylenimine, whereby a chemical reaction with said inner wall is effected.

References Cited in the file of this patent

UNITED STATES PATENTS

| | | |
|---|---|---|
| 1,036,839 | Hasselblad | Aug. 27, 1912 |
| 1,158,400 | Patten | Oct. 26, 1915 |
| 2,201,457 | Smith et al. | May 21, 1940 |
| 2,256,040 | Becker et al. | Sept. 16, 1941 |